United States Patent [19]

Matsuzaki

[11] Patent Number: 5,001,583
[45] Date of Patent: Mar. 19, 1991

[54] FLEXIBLE POLYMERIC RESINOUS MAGNETIC HEAD SUPPORTING DEVICE

[75] Inventor: Mikio Matsuzaki, Tokyo, Japan

[73] Assignee: TDK Corporation, Tokyo, Japan

[21] Appl. No.: 340,532

[22] Filed: Apr. 19, 1989

[51] Int. Cl.⁵ .............................. G11B 5/48; G11B 5/60
[52] U.S. Cl. ....................................... 360/104; 360/103; 360/105
[58] Field of Search ............... 360/104, 105, 103, 106, 360/107, 108, 130.3, 75

[56] References Cited

U.S. PATENT DOCUMENTS

| | | | |
|---|---|---|---|
| 4,167,765 | 9/1979 | Watrous | 360/103 X |
| 4,642,716 | 2/1987 | Wakabayashi et al. | 360/104 X |
| 4,759,119 | 7/1988 | Noguchi et al. | 360/104 |
| 4,761,699 | 8/1988 | Ainslie et al. | 360/104 |
| 4,789,914 | 12/1988 | Ainslie et al. | 360/104 |
| 4,792,875 | 12/1988 | Ohdaira | 360/104 X |
| 4,809,103 | 2/1989 | Lazzari | 360/103 X |
| 4,819,094 | 4/1989 | Oberg | 360/104 X |
| 4,835,642 | 5/1989 | Furukawa et al. | 360/105 X |

FOREIGN PATENT DOCUMENTS

| | | | |
|---|---|---|---|
| 1526514 | 1/1977 | Japan | 360/103 |
| 53-19015 | 2/1978 | Japan | 360/103 |
| 53-30310 | 3/1978 | Japan | 360/104 |
| 53-69623 | 6/1978 | Japan | 360/110 |
| 57-169969 | 10/1982 | Japan | 360/103 |
| 58-22827 | 5/1983 | Japan . | |
| 58-118017 | 7/1983 | Japan . | |
| 59-168968 | 9/1984 | Japan | 360/104 |
| 60-10415 | 1/1985 | Japan | 360/103 |
| 61-93868 | 6/1986 | Japan . | |
| 61-222020 | 10/1986 | Japan | 360/103 |
| 62-12917 | 1/1987 | Japan | 360/103 |
| 62-47890 | 3/1987 | Japan | 360/103 |
| 2064200 | 6/1981 | United Kingdom | 360/104 |

OTHER PUBLICATIONS

IBM Technical Discl. Bull., vol. 26, No. 12, May 84, pp. 6255-6256, "Flexible Cable" by K. C. Jones.

Primary Examiner—David J. Severin
Assistant Examiner—Alfonso Garcia
Attorney, Agent, or Firm—Oblon, Spivak, McClelland, Maier & Neustadt

[57] ABSTRACT

A magnetic head supporting device which includes a supporter having a resilient spring portion and a rigid beam portion contiguous to the resilient spring portion a flexible member whose one end is attached to the supporter at a portion near its free end; a loading projection provided in the upper surface of the flexible member or in the lower surface of the supporter at a portion near its free end to thereby transmit a loading force from the free end of the supporter to the flexible member; and a magnetic head having a slider attached with reading/writing elements, the magnetic head being fixed to the lower surface of the flexible member, wherein the flexible member is composed of a plate of a polymeric resinous material having conductors for wiring, and the conductors are electrically connected to electrodes for the reading/writing elements of the magnetic head.

4 Claims, 5 Drawing Sheets

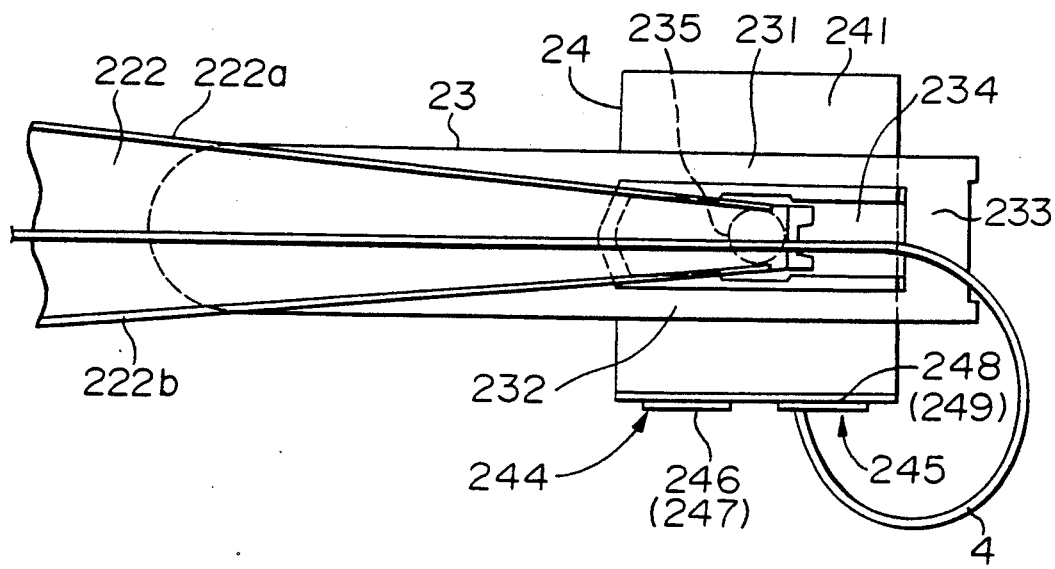
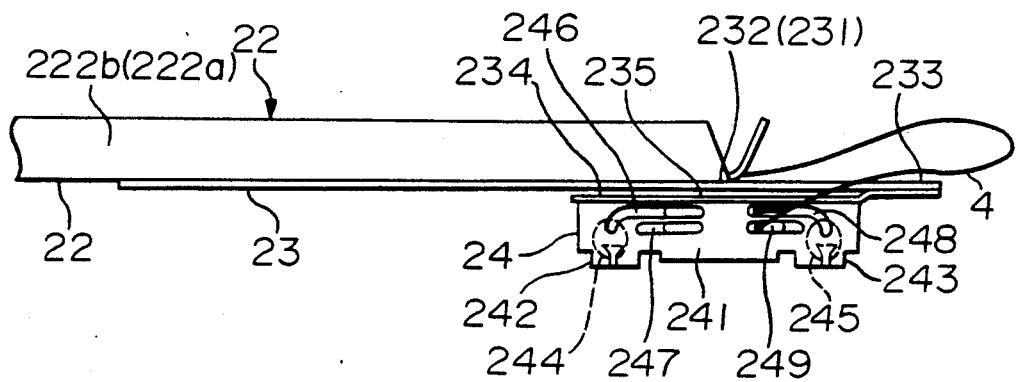

FLEXIBLE POLYMERIC RESINOUS MAGNETIC HEAD SUPPORTING DEVICE

BACKGROUND OF THE INVENTION

1. Field of the Invention

The present invention relates to a magnetic head supporting device. More particularly, it relates to a magnetic head supporting device of a type wherein a flexible member is attached to a supporter at a portion near its free end; a loading projection is provided on the supporter to thereby transmit a loading force from the supporter to the flexible member, and a magnetic head having a slider attached with reading/writing elements is mounted on the lower surface of the flexible member.

2. Discussion of Background

In the magnetic head supporting device of this type, the following requirements have to be satisfied in order that the magnetic head can follow tracks formed in a surface of the magnetic disk with a predetermined small gap. Namely, a slider of the magnetic head holding reading/writing elements undergoes a pitching motion with respect to a first axis and a rolling motion with respect to a second axis which perpendicularly intersects the first axis to thereby remove uneven swinging motions. Such magnetic head supporting device is disclosed, for instance, in Japanese Examined Patent Publication No. 22827/1983 and Japanese Utility Model Publication No. 93868/1986.

FIG. 6 is a front view showing the relation between the conventional magnetic head supporting device and a magnetic disk and FIG. 7 is a plane view of the supporting device and the magnetic disk. In the figures, reference numeral 1 designates a magnetic disk and numeral 2 designates a magnetic head supporting device.

The magnetic disk 1 is driven in the direction of an arrow mark a by a driving unit (not shown). The magnetic head supporting device 2 is held by a positioning unit (not shown) so that it is driven linearly in the direction of an arrow mark b1 or b2, namely, in the radial direction along the diameter O₁ of the rotating magnetic disk 1, and is positioned at a predetermined track so that writing operation to the magnetic disk 1 or reading operation from the disk 1 are carried out.

The magnetic head supporting device 2 comprises a supporter 22 made of a flexible thin elongated plate of a material such as stainless steel, one end of which is fixed to a rigid arm 21, which is in turn attached to the positioning unit, by means of fastening means 211, 212 such as screws. The other end in the longitudinal direction of the supporter 22 which constitutes a free end is attached with a flexible member 23. A magnetic head 24 is attached to the lower surface of the flexible member 23. The supporter 22 comprises a resilient spring portion 221 which constitutes a portion connected to the rigid arm 21. A rigid beam portion 222 is formed integrally with the resilient spring portion 221. The rigid beam portion 222 is provided at both sides with flanges 222a, 222b formed by bending both side portions of the rigid beam portion and this provides a loading force which pushes the magnetic head 24 toward the magnetic disk 1.

FIG. 8 is an enlarged front view showing an important part of the conventional magnetic head supporting device and FIG. 9 is a side view of the same. The flexible member 23 is made of a resilient metallic plate of a material such as stainless steel.

The flexible member 23 comprises a flexible flat plate portion, a pair of flexible outer frame portions 231, 232 formed integrally with both edges of the flat plate portion to extend substantially parallel to the axial line in the longitudinal direction of the supporter 22, a lateral frame 233 connecting both ends of the pair of flexible outer frame portions 231 and 232 at positions apart from the supporter 22, and a central tongue portion 234 which has an end connected to the intermediate portion of the lateral frame 233 and a free end extending toward the supporter, the free end extending between the pair of flexible outer frame portions 231, 232 and substantially parallel to the same. One end of the flexible member 23 which is opposite the lateral frame 233 is connected to the supporter 22 at a portion near its free end by using bonding means such as an adhesive. At substantially the central portion on the upper surface of the central tongue portion 234, a loading projection 235 having, for instance, a semi-spherical form is provided so that the loading projection 235 transmits a loading force from the free end of the supporter 22 to the central tongue portion 234. The loading projection 235 may be attached to the lower surface of the supporter 22 at a portion near the free end. The magnetic head 24 is attached to the lower surface of the central tongue portion 23 by means of, for instance, an adhesive agent.

The magnetic head 24 is provided with a slider 241 which constitutes a ceramic structure. A pair of rails 242, 243 are formed on a surface of the slider 241 with a length so as to face the magnetic disk 1. A pair of reading/writing elements 244, 245 such as thin film type magnetic head elements are attached to the end portions of the rails 242, 243. The surface of the reading/writing elements 244, 245 are covered by a protecting layer of a material such as a ceramic cover. Electrodes 246 and 247 or 248 and 249 each connected to a thin film type conductor coil are attached to the surface of the protecting layer. A pair of lead wires 4 of a linear material are bonded at one end thereof to either one of the reading/writing elements 244, 245, e.g. the electrodes 248, 249 of the reading/writing element 245. The lead wires 4 are bent in a loop and one end of the lead wires is extended toward the rigid beam portion 222 and the resilient spring portion 221 along the upper surface of the supporter 22.

In the above-mentioned conventional magnetic head supporting device, stable floating characteristics can be obtained at an area of flying height of more than 0.3 μm. However, the conventional device has the following problems.

(a) In order to obtain magnetic recording of high density by determining a flying height to be less than ⅓ as the conventionally used flying height, i.e. less than 0.1 μm to thereby reducing the spacing loss, it is necessary to reduce the surface area of the slider 241 opposing the magnetic disk so as to reduce a dynamic pressure for floating. In this case, since the flexible member 23 of the conventional supporting device is constituted by an resilient metallic plate of a material such as stainless steel, the elasticity of the flexible member 23 is too strong in comparison with a dynamic pressure for floating to the slider, with the result that it is difficult to balance the elasticity of the flexible member to the dynamic pressure, and stable control for the posture of the head can not be obtained.

(b) In order to balance the elasticity of the flexible member 23 and the dynamic pressure for floating, the flexible member inevitably has a complicated shape and a structure as disclosed in the above-mentioned publications. Since the flexible member is formed by the resilient metallic plate of stainless steel, it is difficult to form the flexible member into a complex structure. Especially, when the slider constituting the magnetic head is to be miniaturized to thereby accomplish a low flying height, it is necessary to reduce the size of the flexible member 23; this requires further difficult machining.

(c) Connecting and wiring operations are required for the lead wires 4 of a linear material which are to be connected to the electrodes 246 and 247 or 248 and 249 of either one of the reading/writing elements 244, 245. The wiring structure is complicated, and the wiring and assembling operations are troublesome.

(d) The function of the flexible member 23 is influenced by the elasticity of the lead wire 4 to thereby impair stable floating characteristics. If the elasticity of the flexible member 23 and the dynamic pressure for floating on the magnetic head 24 are made small so as to attain a low flying height, the elasticity of the lead wire 4 strongly influences the flexible member and the floating characteristics of the floating member is apt to change.

(e) It is necessary to form a large loop of the lead wire 4 in order to reduce the adverse effects of the elasticity of the lead wire. This results in possible contact of the looped lead wire 4 with the other elements.

SUMMARY OF THE INVENTION

It is an object of the present invention to provide a magnetic head supporting device having a reduced size and a simple wiring structure; accomplishing a low flying height and providing stable operation.

The foregoing and other objects of the present invention have been attained by providing a magnetic head supporting device which comprises a supporter having a resilient spring portion and rigid beam portion a contiguous to the resilient spring portion; a flexible member whose one end is attached to the supporter at a portion near its free end; a loading projection provided in the upper surface of the flexible member or in the lower surface of the supporter at a portion near its free end to thereby transmit a loading force from the free end of the supporter to the flexible member; and a magnetic head having a slider attached with reading/writing elements, the magnetic head being fixed to the lower surface of the flexible member, wherein the flexible member is composed of a plate of a polymeric resinous material having conductors for wiring, and the conductors are electrically connected to electrodes for the reading/writing elements of the magnetic head.

BRIEF DESCRIPTION OF DRAWINGS

A more complete appreciation of the invention and many of the attendent advantages thereof will be readily obtained as the same becomes better understood by reference to the following detailed description when considered in connection with the accompanying drawings, wherein:

FIG. 8 is an enlarged front view showing an important part of the conventional magnetic head supporting device; and FIG. 9 is an enlarged side view of the conventional magnetic head supporting device as shown in FIG. 8.

DETAILED DESCRIPTION OF PREFERRED EMBODIMENTS

Figure 1:
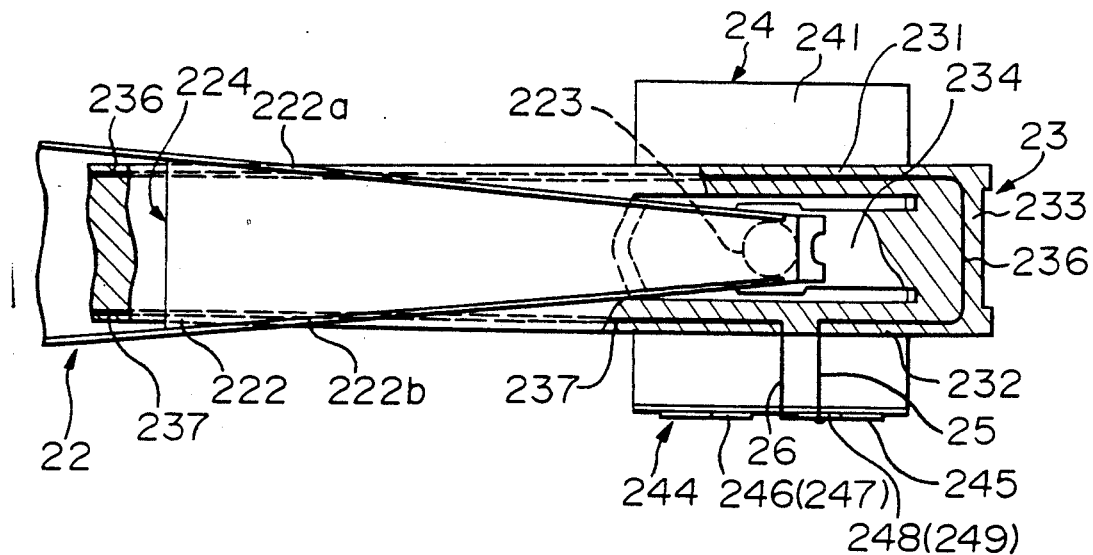
FIG. 1 is a front view of an embodiment of the magnetic head supporting device according to the present invention.
Figure 2:
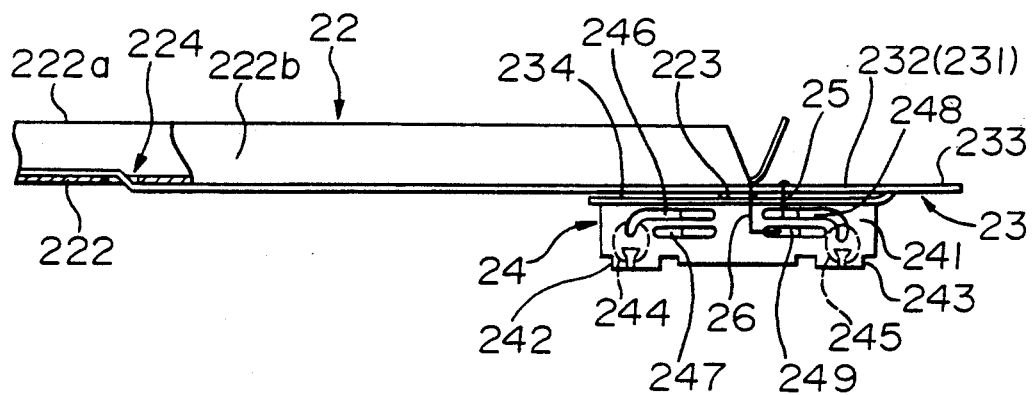
FIG. 2 is a side view of the magnetic head supporting device shown in FIG. 1.
Figure 3:
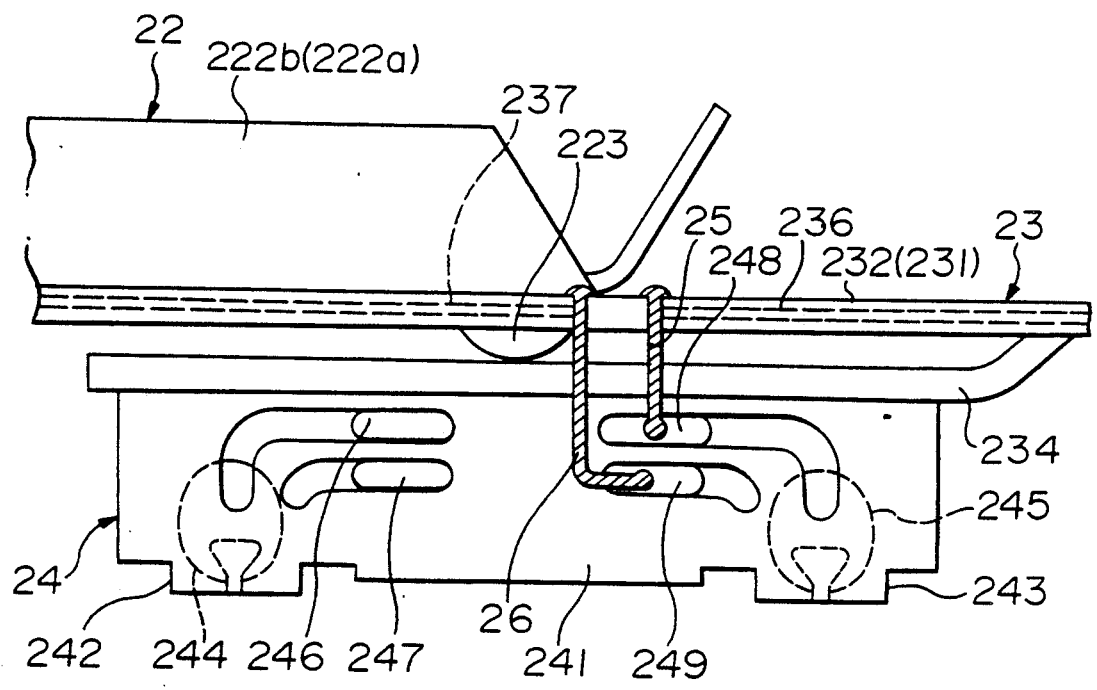
FIG. 3 is an enlarged partial side view of the magnetic head supporting device as shown in FIG. 2.

Several embodiments of the magnetic head supporting device of the present invention will now be described with reference to the drawings, wherein the same reference numerals designate the same or corresponding parts.

A flexible member 23, which was conventionally made of a resilient metallic plate of a material such as stainless steel, is constituted by a plate of a polymeric resinous material. The plate of a polymeric resinous material is provided with conductors 236, 237 for wiring. Preferably, the flexible member 23 has such a construction that the conductors 236, 237 having a thickness of about several tens $\mu$m are embedded as lines for wiring in a flexible plate-like material made of a polymeric resinous material having a thickness of about 125 $\mu$m–250 $\mu$m.

Each end of the conductors 236, 237 is electrically connected to electrodes of either reading/writing element 244 or 245 of the magnetic head 24, for instance, to electrodes 248, 249 of the reading/writing element 245, and each other end is drawn outside. Beam lead conductors 25, 26 respectively connect the conductors 236, 237 to the electrodes 248, 249. The rear end portion of the flexible member 23 of a polymeric resinous plate-like material extends on the upper surface of the rigid beam portion 222 of the supporter 22 through an opening 224 formed in the supporter, and the rear end portion of the flexible member 23 is fixed to the rigid beam portion 222 by bonding.

In this embodiment, in the same manner as the conventional supporting device, the flexible member 23 comprises two flexible outer frame portions 231, 232 extending substantially in parallel with the axial line in the longitudinal direction of the supporter 22, a lateral frame 233 connecting the flexible outer frame portions 231, 232 at the end far from the supporter 22 and a central tongue portion 234 extending substantially in parallel with the flexible outer frame portions 231, 32 from around the center of the lateral frame 233 and having its forward end as a free end. One end opposite to the end with the lateral frame 233 is connected a point near the free end of the supporter 22 by means of e.g. bonding. The conductors 236, 237 are embedded in the flexible outer frame portions 231, 232 and the lateral frame 233. A loading projection 223 having, for instance, a semi-spherical shape is provided on the lower surface of the supporter 22 at a position near the free end so that a loading force is transmitted from the free end of the supporter 22 to the central tongue portion 234. The loading projection 223 may be provided on the upper surface of the flexible member 23 in the same manner as the conventional device.

Thus, by forming the flexible member 23 by a polymeric resinous plate-like material, the flexible member 23 having a weak spring function and a high degree of freedom of twisting and elongation can be obtained in comparison with the conventional resilient metallic plate of a material such as stainless steel. The flexible member 23 having the above-mentioned structure assures balance between the dynamic pressure for floating acting on the slider 241 and the elasticity of the flexible member 23, and stable posture of the magnetic head even when the magnetic head 24 is miniaturized to thereby reduce flying height and to increase the density of magnetic recording. Further, the flexible member 23 allows easy machining operations because it is formed by a polymeric resinous material.

Since the flexible member is so constructed that the polymeric resinous plate-like material includes the conductors 236, 237 for wiring which are electrically connected to the electrodes 248, 249 of the reading/writing element 245 of the magnetic head 24, the conductors 236, 237 can be utilized as signal lines for taking out reading/writing signals. The same effect is obtainable when the conductors 236, 237 for wiring are respectively connected to the electrodes 246, 247 of the reading/writing element 244. The construction of the magnetic head supporting device of the present invention simplifies the wiring structure and eliminates any adverse effect on the flexibility of the flexible member 23 unlike the conventional device having the outer lead wires.

Figure 4:
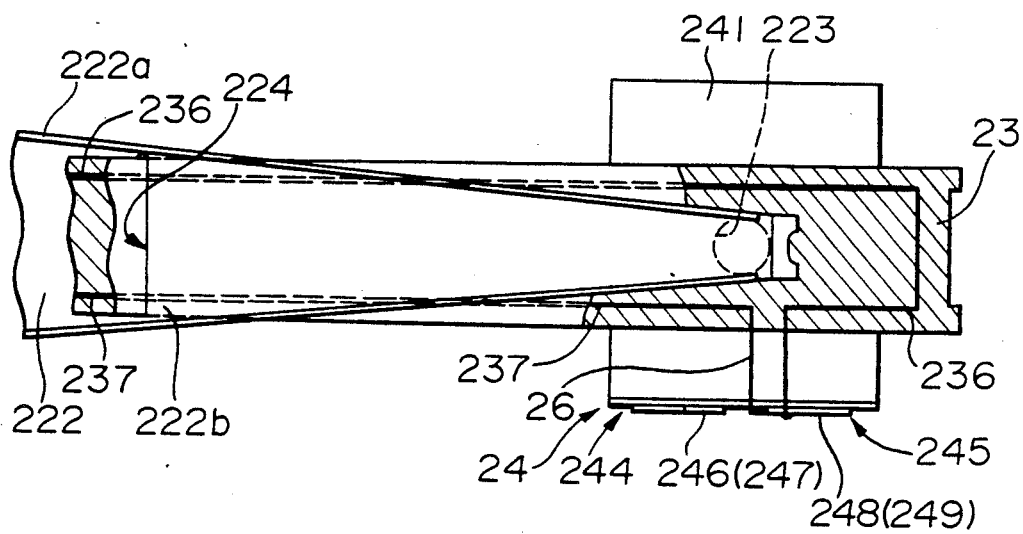
FIG. 4 is a front view of another embodiment of the magnetic head supporting device according to the present invention.
Figure 5:
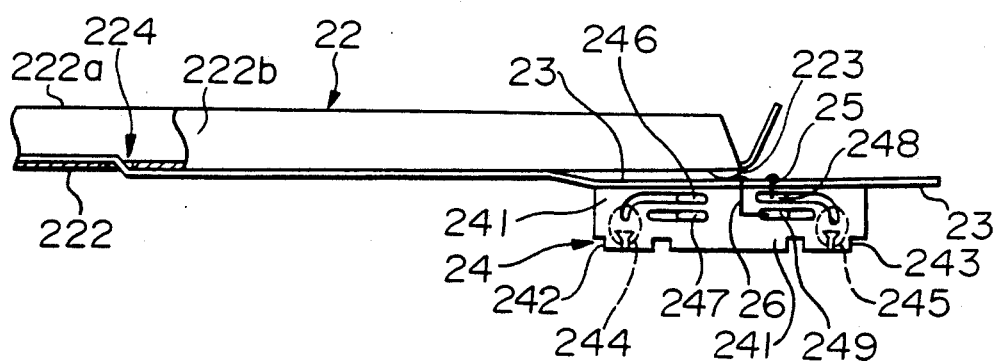
FIG. 5 is a side view of the magnetic head supporting device as shown in FIG. 4.
Figure 6:
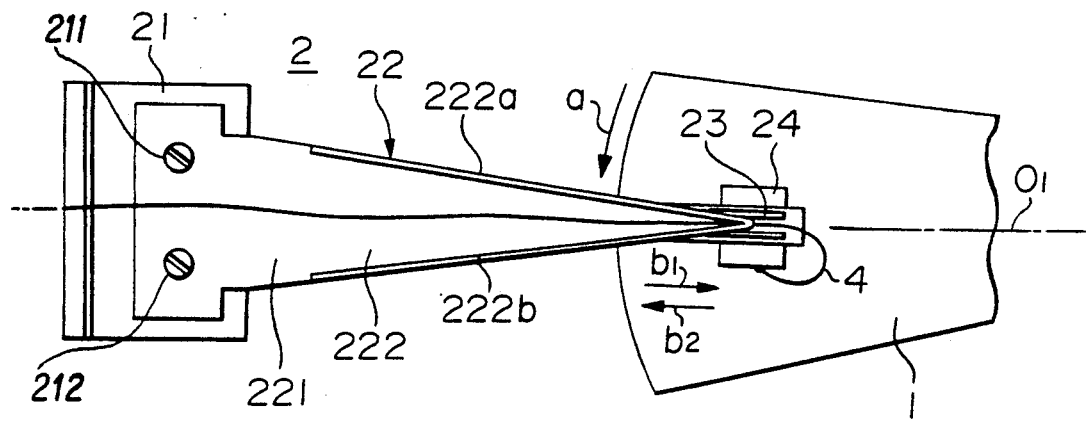
FIG. 6 is a front view showing the relation of a conventional magnetic head supporting device and a magnetic disk.
Figure 7:
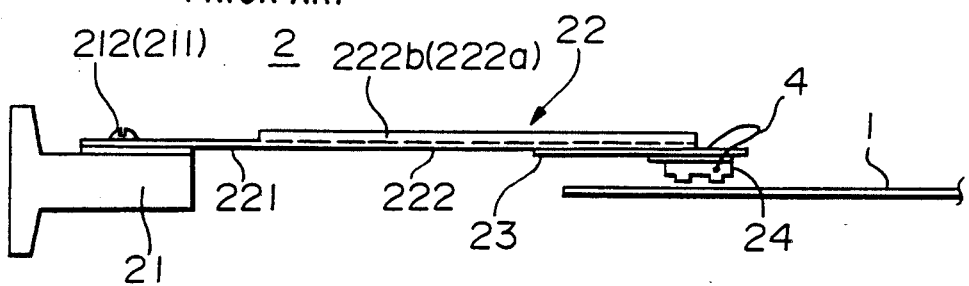
FIG. 7 is a side view of the conventional magnetic head supporting device and the magnetic disk.

FIG. 4 is an enlarged front view of another embodiment of the magnetic head supporting device according to the present invention, and FIG. 5 is a side view showing the magnetic head supporting device as shown in FIG. 4.

In FIGS. 4 and 5, flexible member 23 is formed by a single flat plate of a polymeric resinous material without providing flexible outer frame portions, a lateral frame portion and central tongue portion. In this embodiment, the shape and the structure of the flexible member 23 are simplified and machining and assembly of the flexible member are made easy by utilizing the features of a plate of polymeric resinous material having a high degree of freedom of twisting and elongation.

Thus, in accordance with the present invention, the following effects can be obtained.

(a) The flexible member made of the polymeric resinous material has a high degree of freedom of twisting and elongation. Accordingly, there is obtainable a magnetic head supporting device which assures balance between the dynamic pressure for floating on the slider and the elasticity of the flexible member and stable posture of the magnetic head even when the magnetic head is miniaturized to thereby reduce a flying height and to increase the density of magnetic recording.

(b) Since the flexible member is formed by a polymeric resinous material, the flexible member can be easily machined and assembled.

(c) The conductors for wiring are attached or embedded in a plate of a polymeric resinous material, and the conductors are electrically connected to the electrodes of the reading/writing elements. Accordingly, the conductors can be utilized as wires for reading/writing signals. Accordingly, the flexibility of the flexible member is not adversely affected by the outer lead wires.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic head supporting device which comprises:
   a supporter having a resilient spring portion and a rigid beam portion contiguous to said resilient spring portion and being made of a polymer resinous material;
   a flexible member having one end attached to said supporter at a portion near a free end of said supporter;
   a loading projection provided at one of an upper surface of said flexible member and a lower surface of said supporter at a portion near the free and of said supporter to thereby transmit a loading force from the free end of said supporter to said flexible member; and
   a magnetic head having a slider with reading/writing elements connected thereto, the magnetic head being fixed to the lower surface of said flexible member, wherein said flexible member substantially exclusively comprises a plate of a polymeric resinous material having conductors for wiring, and wherein said conductors are electrically connected to electrodes for said reading/writing elements of the magnetic head, said plate has a rear end portion thereof extending on said rigid beam portion of the supporter through an opening formed in said supporter, and said rear end of said plate is on an upper surface of the rigid beam portion and has a free end portion extending to a lower portion of said rigid beam portion of said supporter.

2. The magnetic head supporting device according to claim 1, wherein said conductors for wiring are embedded in said plate and said plate comprises a polymeric resinous material.

3. The magnetic head supporting device according to claim 1, wherein said conductors for wiring are connected to said electrodes and said conductors comprise beam lead conductors.

4. The magnetic head supporting device according to claim 1, wherein said flexible member is made of polymide resin.

* * * * *